Jan. 27, 1931. C. A. GREENAWALT 1,790,142
VEHICLE SIGNAL SWITCH
Filed Dec. 11, 1928
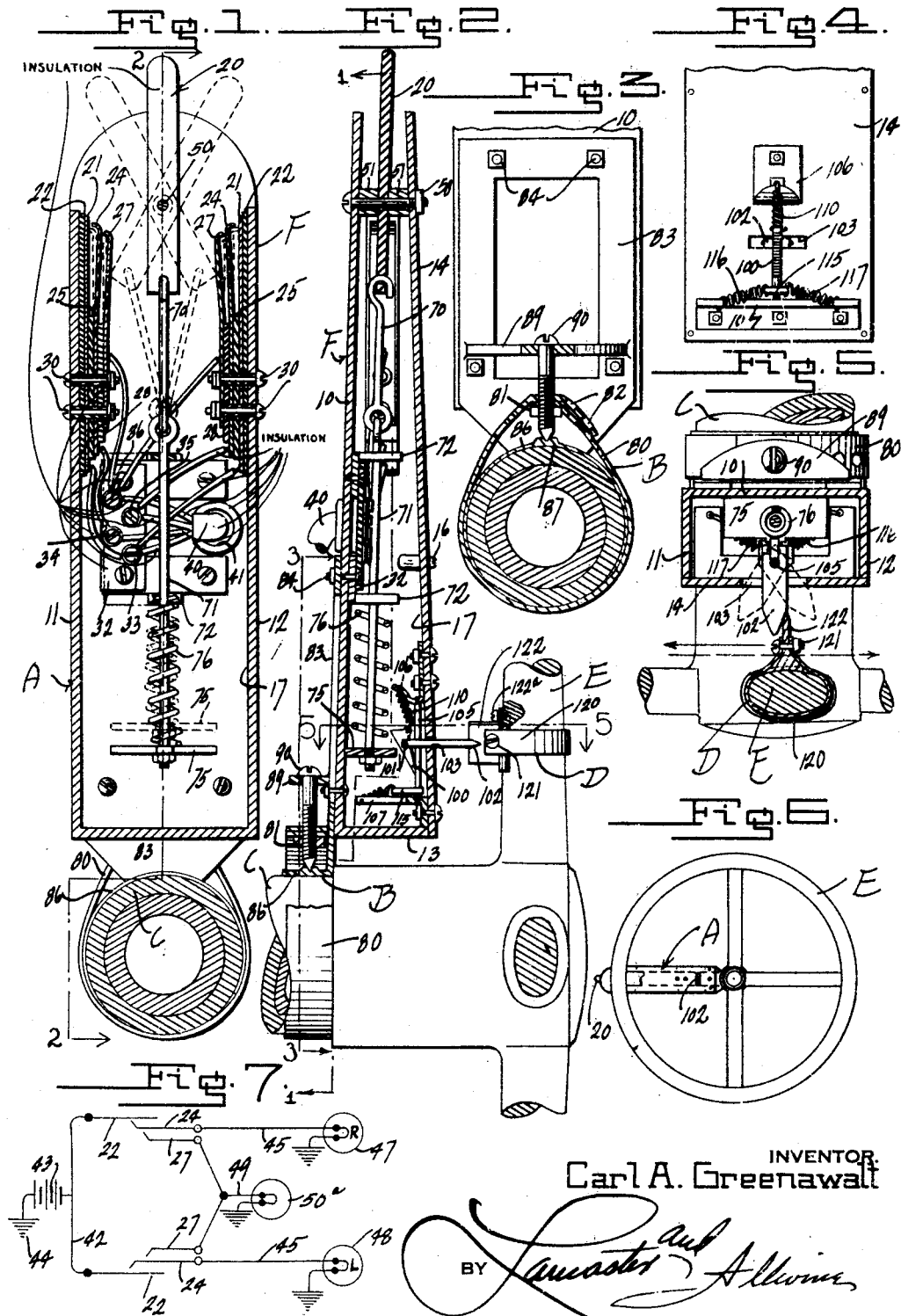
INVENTOR.
Carl A. Greenawalt
BY
ATTORNEYS.

Patented Jan. 27, 1931

1,790,142

UNITED STATES PATENT OFFICE

CARL A. GREENAWALT, OF STERLING, COLORADO

VEHICLE SIGNAL SWITCH

Application filed December 11, 1928. Serial No. 325,321.

This invention relates to improvements in signal switch mechanisms.

The primary object of this invention is the provision of an improved circuit closing switch adapted to be used in connection with automotive vehicles for the purpose of signalling traffic in the rear or advance of a vehicle, a contemplated change in directional movement of the vehicle; an improved automatic trip mechanism being provided for releasing the switch mechanism to a neutral position after the change in the direction of the vehicle movement has been made.

A further and important object of this invention is the provision of an improved manually operated switch mechanism having an automatic trip mechanism therefor.

Other objects and advantages of this invention will be apparent during the course of the following detailed description.

In the accompanying drawing, forming a part of this specification, and wherein similar reference characters designate corresponding parts throughout the several views, Figure 1 is a sectional view taken longitudinally of the switch mechanism, showing the same attached to a post of an automotive vehicle, the view being taken substantially on the line 1—1 of Figure 2.

Figure 2 is a sectional view taken through the improved switch mechanism substantially on the line 2—2 of Figure 1.

Figure 3 is a sectional view taken through the switch mechanism and steering post, showing the attachment of the former to the latter, the view being taken substantially on the line 3—3 of Figure 2.

Figure 4 is a fragmentary view showing an improved spring supporting detent for holding the details of the switch mechanism in an operating position.

Figure 5 is a sectional view taken substantially on the line 5—5 of Figure 2.

Figure 6 is a plan view of the steering wheel, showing the manner in which the switch casing is attached to the post thereof; one of the spokes being removed to expose the switch casing.

Figure 7 is a diagrammatic representation of the wiring circuit in which the signal is used.

In the drawing, wherein for the purpose of illustration is shown only a preferred embodiment of the invention, the letter A may generally designate the improved switch, which is detachable by means B to a steering post C of an automobile. Means D is adjustably mounted upon a spoke of the steering wheel E for the purpose of automatically tripping the detent which holds the switch in a signal operating position.

The switch A preferably comprises the casing F, which includes an elongated bottom 10 having side walls 11 and 12 and an end wall 13, adjacent to where the means B attaches the casing to the steering post C. A detachable closure 14 is provided, which may be detachably secured as at 16 along the side walls, to enclose the compartment 17, wherein the operating details of the switch are positioned. The end of the casing opposite the wall 13 is open, and thru which extends the operating handle 20 to be subsequently described.

A plurality of switch contacts are mounted on the walls 11 and 12 in spaced facing relation in the compartment 17. Thus, on each wall 11 and 12 adjacent to the operating lever 20, it is preferred to place a contact 21, upon a strip of insulating material 22. A resilient contact arm 24 is mounted upon the contact 21; being insulated therefrom by insulation strip 25, and at its outer end being substantially J-shaped and normally flexed to inherently lie spaced from the contact plate 21. Other spring contact arms 27 are mounted in spaced relation with respect to the spring contact arms 24, being relatively insulated therefrom by insulation strips 28, and normally inherently positioned to lie spaced at their outer J-shaped ends from the contact arms 24 which are respectively adjacent thereto. Bolts 30 are provided for connecting the three contact pieces, with their relatively insulating strips therebetween, upon each of the side walls 11 and 12, as shown in the drawing.

On the bottom wall 10 of the casing, in the compartment 17, is mounted an insulation block or strip 32, upon which binding posts 33, 34, 35 and 36 are positioned, and as shown in Figure 1 of the drawing. The contact arms 27 of the two side switches are connected by wires, with the binding post 36, as shown in Figure 1. The respective intermediate switch arms 24 are individually connected to the binding posts 34 and 35, while the contact strips 22 are connected to the single binding post 33, by short lengths of wire, as shown in Figure 1. The wires then extend into a single containing conduit 40 of insulating material, and are projected thru an opening 41 in the bottom wall.

Referring at this time to the wiring diagram, as shown in Figure 7, it is noted that the contact strips 22 are in direct circuit 42 with the storage battery 43 which may be grounded at 44. Intermediate spring contact arms 24 are each connected by wires 45 with the respective "right" and "left" signalling lamps 47 and 48, and the spring contact arms 27 are connected in a common circuit 49 with the signal lamp 50$^a$. These signal lamps are all grounded in circuit with the storage battery 43.

The operating handle or lever 20 is pivoted between its ends on a pin or bolt 50, which is properly held spaced by sleeves 51 intermediate the top and bottom walls of the casing F. One end of the lever 20 projects beyond the end of the casing F, in order that the operator may grasp the same and swing it to the right or left on the pivot pin 50. The other end of the lever 20 is in position to engage the contact arms 27 of the switches on each of the side walls of the casing, for the purpose of respectively closing the switches by engaging the contacts 21, 24 and 27 of the switch arrangement on each of the side walls, as desired. Thus, if it is desired for an operator to signal a right hand turn, it is merely necessary for the operator to swing the lever 20 to the right, and this lever at its inner end will engage the switch contact 27 on the left wall of the casing, and cause the contacts 21, 24 and 27 on the left wall of the casing to engage, for the purpose of closing the circuits through the lamps 47 and 50$^a$, and signalling to vehicular traffic in advance or the rear, or both the advance and the rear, contemplated changes in the direction of movement. Likewise, swinging the lever 20 to the left will cause an operation of the signal lamps 48 and 50$^a$, signalling a left hand turn. If desired, the lamp 50$^a$ need not be provided, since it is obvious that the lamps 47 and 48 will signal the contemplated changes in directional movement. However, in some signal mechanisms a plurality of signalling parts are provided, and for this reason a plurality of lamps may be preferably lighted at each signalling operation. Also, the lamp 50$^a$ may be placed within the vision of the vehicle operator, to signal whether the circuit is operative.

Means is provided in connection with the improved signal mechanism to hold the signalling circuits closed when once operated by the vehicle operator, until the same are automatically tripped. To this end, the hand operated lever 20 within the casing is connected by a pivoted connecting rod or link 70 with an eye end of a longitudinally slidable rod or member 71, which is longitudinally slidably supported by standards 72 within the housing F, on the bottom 10, as shown in Figures 1 and 2 of the drawing. The plunger or slide rod 71 at its inner end is provided with a plate-like member 75, detachably held on the slide member 71 for movement therewith. A compression spring 76 is under normal compression between this plate-like member 75 and the adjacent upright 72, and the function of which spring is to normally urge the operating handle 20 into a longitudinally aligned position in the signal casing, out of contact and between the switches mounted on the side walls, as shown in Figure 1.

The means B for maintaining the switch mechanism upon the steering post preferably comprises a flexible adjustable band 80, shown in Figure 3 of the drawing, one end of which may be provided with a nut 81 and the opposite end of which may have a plurality of openings 82 therein. It is intended to encircle the steering column with the band 80. A detachable frame or plate 83 is connected at 84 upon the bottom wall 10 of the casing F, and at its end projecting beyond the wall 13, and being provided with a segment 86, which is more or less flexible and provided with a socket 87. The frame 83, spaced from the segment 86, is provided with a transverse support 89 having a screw 90 thereon, which is adapted to be adjusted in the nut 81 and thru one of the openings 83 in the other end of the encircling band 80. The application of the device B will be apparent. The band 80 is adjusted upon the steering post immediately below the steering wheel E, and the segment 86 is disposed within the looping of the band 80, and upon adjustment of the bolt or screw 90, it is quite apparent that the band 80 may be drawn tight about the steering column and the segment 86 pressed against the steering column. This will support the switch casing in a radial position upon the steering column, below the steering wheel. The position may be readily adjusted.

Detent means is provided to releasably hold the handle 20 in a switch closing position. This means preferably comprises a detent member 100, which is pivoted intermediate its ends at 101 to a transverse shank 102 which extends movably through an opening 103 in the wall or cover 14 of the casing F. A supporting rod or member 105 is secured at its ends in suitable outer and inner brackets 106 and 107, shown respectively as attached to the inside of the wall 14, and this rod forms a pivot for the shank 102, between the pivot connection 101 above mentioned and the wall 14. A tensioned spring 110 is secured at its upper end to the bracket 106, as shown in Figure 2, and at its lower end to the upper end of the detent 101 at a location which will throw the lower end of the detent 100 against the rod or support 105, as is shown in Figure 2 of the drawing. The rod or shank 105 is pivoted in its upper and lower bearing brackets, and at its lower end it is provided with an inwardly extending shank or arm 115, to which tension springs 116 and 117 are connected; the said springs extending divergently away from the arm 115 and being connected to the bracket 107 above mentioned to cause the pivoted support 105 to normally return to a position where the detent 100 is in the relation shown in Figure 2.

It is understandable from the foregoing that when the handle or lever 20 is operated to close one or other of the switches, the disc or member 75 on the sliding rod 71 engages and tips the upper fore part of the detent 100, sliding over the sloping lower edge thereof, and enabling the disc 75 to ride beyond the detent 100; the spring 110 moving the latter back to the position shown in Figure 2, in order to catch the plate or member 75 in the position shown in the dotted lines in Figure 1 and hold the lever 20 in a switch closing position, either to the right or left, as shown by the dotted lines in Figure 1.

The means D for causing an automatic trip of the detent to release the switch preferably comprises a clamping band 120, which is attached about a spoke of the steering wheel, by a bolt 121, and between its ends supports a trip finger 122 which extends below the steering wheel in the path to engage the detent part 102, as shown in the drawing. A screw 122ª holds the band in position.

It is obvious that after the operator has pressed the lever 20, signalling a contemplated turn, the detent will be in position to hold the particular switch closed. As the turn is completed the steering wheel attached trip finger will engage the shank 102 and trip the detent to permit the spring 76 to release the engagement of the handle 20 and the switches will be thrown open.

Various changes in the shape, size, and arrangement of parts may be made to the form of invention herein shown and described, without departing from the spirit of the invention or the scope of the claims.

I claim:

1. In a signal switch, a casing, a slidable rod carried by the casing, a pivoted operating lever, means connecting the sliding rod with the pivoted operating lever, spring means acting to force the sliding rod into normal alignment with the operating lever, contact means comprising a pair of normally insulated contacts in the path to be relatively closed by operation of the pivoted lever, detent means for holding the operating lever in a switch closing position with respect to said contacts, and automatic trip means movable to trip the detent means.

2. In a signal switch mechanism the combination of an elongated casing, a pivoted lever on the casing extending at one end from the casing for manual operation, a slidable rod mounted in the casing for sliding towards and away from the lever, a link pivoting the sliding rod to the lever at the opposite side of the pivot of the lever from the end which extends for operation from the casing, a compression spring operating longitudinally upon the rod and casing for forcing the rod away from the lever to pull the lever into alignment with the rod, and switch means on the casing laterally of the pivoted lever operable by the lever upon movement of the lever.

3. In a signal switch mechanism the combination of an elongated casing, a pivoted lever on the casing extending at one end from the casing for manual operation, a slidable rod mounted in the casing for sliding towards and away from the lever, a link pivoting the sliding rod to the lever at the opposite side of the pivot of the lever from the end which extends for operation from the casing, a compression spring operating longitudinally upon the rod and casing for forcing the rod away from the lever to pull the lever into alignment with the rod, switch means on the casing laterally of the pivoted lever operable by the lever upon movement of the lever, and releasable detent means for holding the spring further compressed and the lever in a switch closing relation when the latter is moved to such position.

CARL A. GREENAWALT.